United States Patent [19]
Wolstenholme et al.

[11] Patent Number: 6,086,475
[45] Date of Patent: Jul. 11, 2000

[54] METHOD OF FORMING A GRAIN PILE

[76] Inventors: Paul P. Wolstenholme, 305 B Hunter St., Apex, N.C. 27502; John W. Donahue, 536 Shafor Blvd., Dayton, Ohio 45419

[21] Appl. No.: 09/146,680

[22] Filed: Sep. 3, 1998

[51] Int. Cl.[7] ............................... E04H 7/22; B65G 3/00
[52] U.S. Cl. ............................. 454/182; 52/192; 414/300
[58] Field of Search ..................................... 454/174, 182; 198/657; 52/192, 197; 414/293, 300

[56] References Cited

U.S. PATENT DOCUMENTS

| | | | |
|---|---|---|---|
| 2,895,400 | 7/1959 | Topf | 454/182 |
| 3,140,161 | 7/1964 | Poyner et al. . | |
| 4,493,248 | 1/1985 | Wolstenholme . | |
| 4,793,742 | 12/1988 | Strand | 406/79 |

OTHER PUBLICATIONS

Jaeger et al, "The Physics of Granular Materials", *Physics Today*, Apr. 1996, pp. 32–38.
Jaeger et al, "Physics of the Granular State," *Science*, Mar. 20, 1992, pp. 1523–1531.
Peterson, "Dry sand, wet sand", *Science News*, Sep. 20, 1997, p. 186.

*Primary Examiner*—Harold Joyce

[57] ABSTRACT

A method of forming a grain pile by pushing grain into a buried insertion point. A screw conveyor grain at ground level from a receiving point to the buried insertion point. The screw conveyor creates a pile core at the insertion point and forcibly enlarges the pile core into a large pile against forces of natural resistance. Piles as large as 2,000,000 bushels can be formed by a conveyor having a drive motor of less than 50 horsepower. Grains of different properties may be formed into a pile and become blended as a consequence thereof.

19 Claims, 6 Drawing Sheets

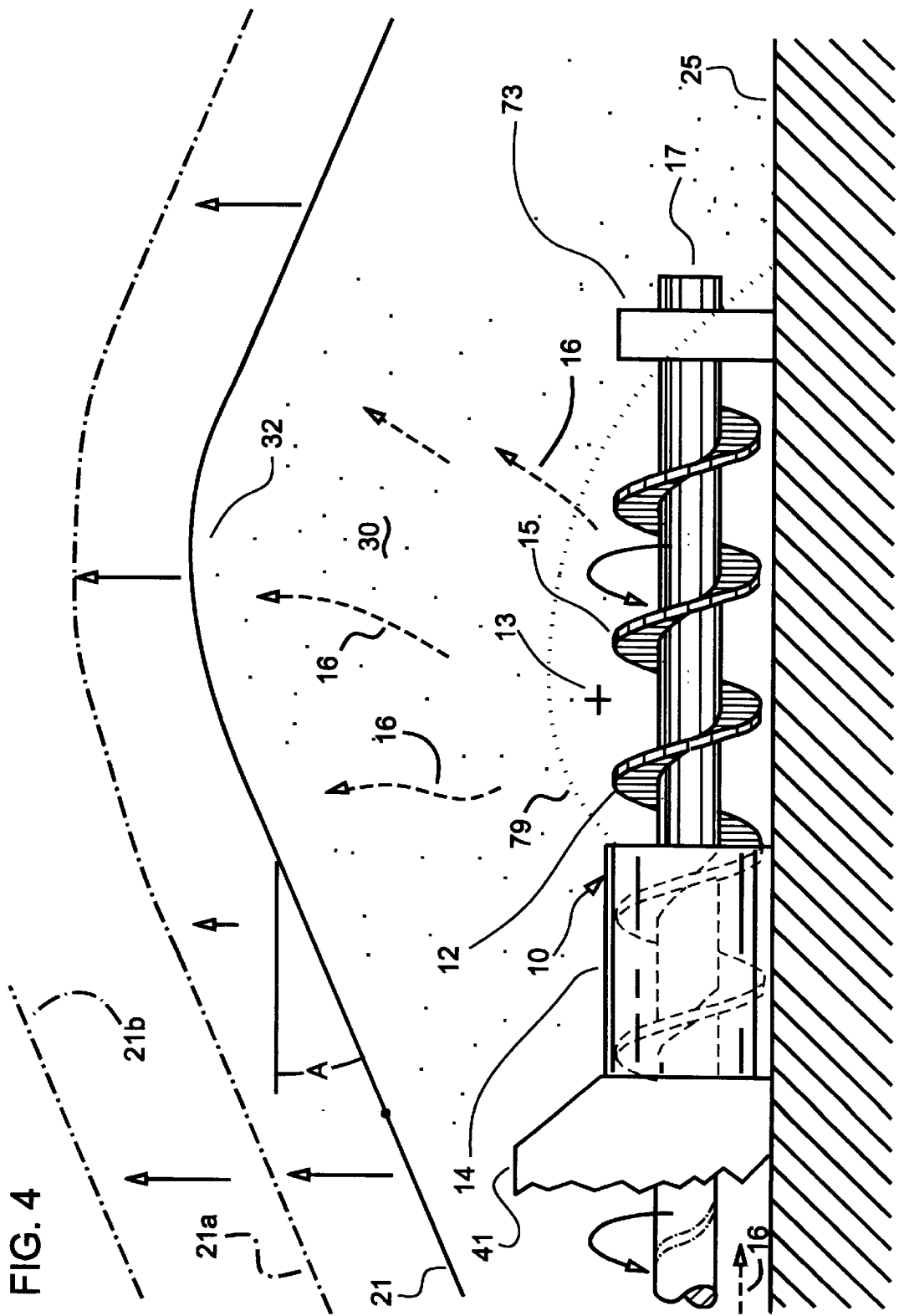

METHOD OF FORMING A GRAIN PILE

BACKGROUND OF THE INVENTION

This invention relates to covered grain piles and, more particularly to cover-on-first grain piles, that is, piles wherein the grain is introduced under a previously positioned cover. In one aspect the invention is concerned with contemporary storage facilities wherein grain is introduced under a flexible cover and formed into a pile as large as one-million bushels, or more. A typical example is disclosed in Wolstenholme U.S. Pat. No. 4,493,248.

As taught in the Wolstenholme patent, triangularly shaped sections of canvas are laid out surrounding a tower situated inside a retaining wall and are edgewise joined to define a flexible cover. The apices of the triangular canvas sections are joined to a lifting ring and are hoisted up the tower to a predetermined height. This causes the cover to pull saggingly inward. The grain which is to be stored is transported by conveyor to the top of the tower and then poured downwardly through the center of the tower to spaced outlets. It exits the tower through those outlets and forms a pile which lifts and spreads the cover. Grain spoilage is avoided during storage by an aeration technique using a fan mounted at the top of the tower. The fan is operated to pull a flow of cooling air through perforations in the retaining wall, thence through the grain pile and finally through perforations in the tower. The air is then exhausted to the atmosphere.

The Wolstenholme patent represents a substantial improvement over cover-on-after systems, because it avoids labor intensive manual spreading of the cover on top of the grain. It also avoids risk of water damage by keeping the grain covered throughout the fill. Yet there remain three problems for which a solution is desired. First there is a rather considerable expense involved in building the tower and erecting elevated conveyors. Secondly, if heavy weather occurs during a fill, the cover must be lowered to a sheltered position against the grain. This avoids wind damage but interrupts filling. Thirdly, the grain suffers damage from impact against conveyor buckets during elevation, against downspouts during a high velocity fall and against the base of an empty or partially empty storage facility at the end of the fall.

In a second aspect the invention is concerned with traditional grain storage facilities equipped with self-supporting covers (roofs). Such facilities generally have side walls reaching higher than the maximum height of the grain stored therein. Typical examples are concrete silos and steel storage buildings. Heretofore traditional grain storage facilities have been filled by conveying the grain to an elevated location and then dropping it inside the facility. Again, there is a certain expense factor associated with elevated conveying. Furthermore, as the grain falls into the storage facility it raises considerable dust, which creates a risk of explosion. There is a need for a method of forming a grain pile which eliminates these concerns.

SUMMARY OF THE INVENTION

This invention provides an improved grain pile formation method wherein the grain is forcibly discharged into the pile at a buried insertion point.

It is known that grain can be poured in a manner similar to a liquid. However, it does not level out when it impacts a support surface. Rather it forms a self-supporting conical pile which is inclined downwardly at a natural angle of repose. This angle depends upon the physical characteristics of the particular granules of interest and upon the technique employed in building the pile. For a center pour the grain pile achieves a maximum angle of repose, which in the case of corn is about 23 degrees. In the practice of this invention the resulting grain pile slopes downwardly at a slightly smaller angle than the maximum.

Those who are familiar with granular phenomena know that the granules tend to settle into a pattern of nested arches and that a poured pile builds conically upward toward the pour point. The granules collect at the peak of the pile and shift intermittently downward along diagonally directed fracture lines. It has been reported that the pressure exerted on a tabletop by a conical pile of flowable granular material is highest along a circular line which is closer to the edge than to the middle. (Article entitled "Dry sand, wet sand" by Ivars Peterson, Science News, Sep. 20, 1997). Moreover, if grain is piled inside a tall cylindrical container, much of the weight is transferred to the sidewalls, and the base pressure does not increase indefinitely with pile height. Consequently the pressure at the center of a grain pile base may be relatively low.

In accordance with this invention it has been found relatively easy to form a grain pile by force feeding grain to a non-elevated insertion point, preferably through use of a screw conveyor. As the grain accumulates, it buries the insertion point. Then as the accumulation continues, the grain forms a rounded conical pile. The grain appears to be pushed generally upward and outward, away from the insertion point. This creates a progressively rising, rounded top. However, the pile cannot maintain a steep sidewall. Therefore, as the grain is pushed laterally outward, the surface collapses, and takes on a conical shape. The final pile (if non-supported) is a frustum capped by a spherical segment. If a sidewall is provided, then the base of the pile conforms to the wall. Since the granules are never airborne, the process generates extremely little dust.

The method of this invention has been found to mix the grain quite effectively. In an experiment using a scale model having relatively high sidewalls, small amounts of colored granules were fed into the screw at different times during a grain filling process. The colored granules unexpectedly were found to be distributed uniformly throughout the finished pile, irrespective of the time of their addition. Thus the invention may be used for blending grains of different age, type, quality or moisture content. While blending has previously been performed during top pour filling, and has occurred inherently during screw conveyor unloading, only partially satisfactory results could be achieved in the prior art.

The method of this invention may be used for forming a grain pile in either a traditional or a contemporary storage facility. When used in a contemporary storage facility, the cover may be flexible and may rest directly upon the grain, so that it is lifted by the grain, as the pile forms. The grain pile may be aerated to retard spoilage, if storage is contemplated for anything other than a very short time, less than about 60 days.

This invention therefore contemplates a pile formation process wherein grain is transported to an insertion point and caused to become incorporated into a pile core extending above and around the insertion point. Thereafter, the pile core is enlarged by transporting additional grain to the insertion point and pushing it into the pile against forces of natural resistance. The process is continued until a pile of suitable size has been formed.

*** The invention also contemplates a grain storage method wherein the above-mentioned grain pile formation process is carried out under a flexible cover and inside a retaining wall; pile formation being followed by pile aeration. Such a storage process is very economical, protects the grain during the filling process and protects the cover from high winds.

BRIEF DESCRIPTION OF THE DRAWING

FIG. 4 is a schematic illustration of upwardly forced growth of a grain pile.

DESCRIPTION OF THE PREFERRED EMBODIMENT

Figure 1:
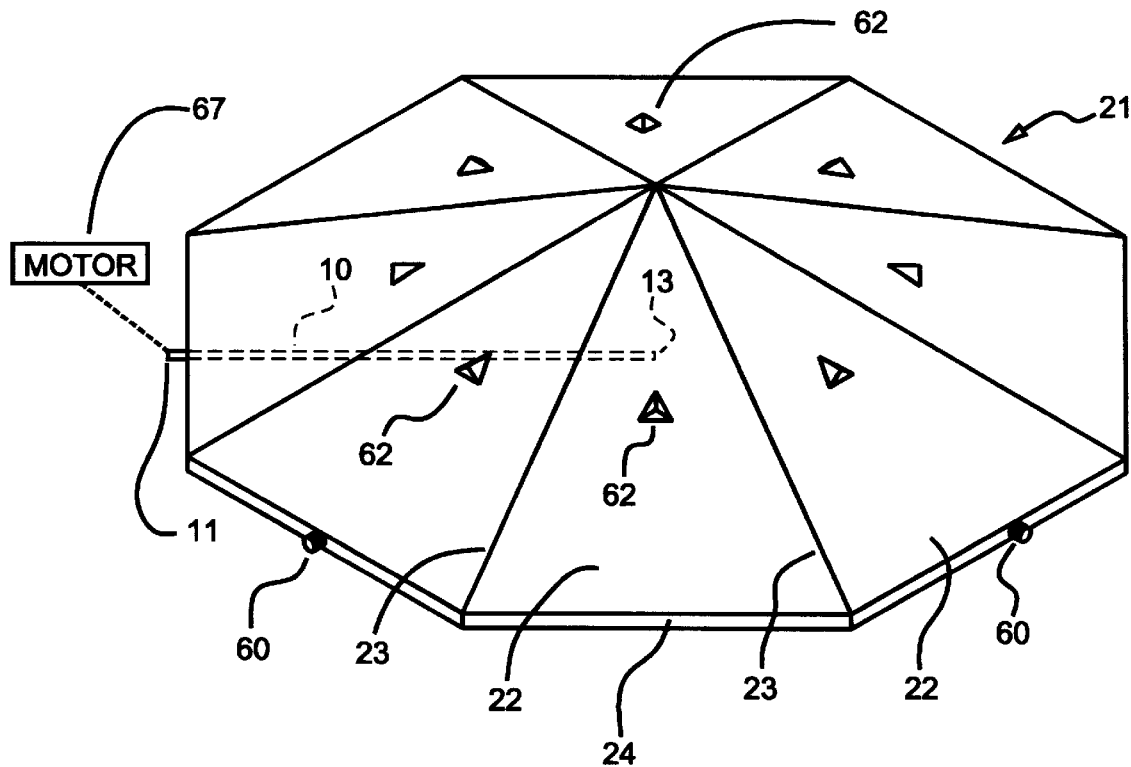
FIG. 1 is a perspective view of a fully formed grain pile.

In its preferred embodiment, the method of this invention forms a grain pile 30 as indicated in FIG. 4. Grain pile 30 is covered by a flexible cover 21 as generally indicated by reference numeral 21 of FIG. 4 and FIG. 1. The grain pile is formed inside an enclosed retaining wall 24 which is penetrated by a positive displacement grain conveyor, such as a screw conveyor 10. Screw conveyor 10 rests on a base 25. Grain is fed into a covered trough 41 at a receiving point 11 and carried by a screw 12 to an insertion point 13, located inside retaining wall 24, preferably near the center of the facility.

Trough 41 is run only partially full and is isolated from pile pressure by a stuffing box 14. Stuffing box 14 is a collar-shaped device having an inside diameter only slightly larger than screw 12. It has a length somewhat longer than the pitch of screw 12. Stuffing box 14 therefore provides positive displacement delivery of grain into grain pile 30 at insertion point 13. The end of screw 12 is exposed for contact with the grain mass. Screw 12 has a shaft 17 which may be supported by a bearing block 73. As grain first discharges from stuffing box 14, it forms into a pile core 78. Screw 12 force feeds the pile core and converts it into a much larger storage pile, as described more fully below.

The process of forming a covered grain pile may commence with the erection of retaining wall 24. The retaining wall may be supported by a series of steel support braces as illustrated in FIG. 4 of Wolstenholme U.S. Pat. No. 4,493,248. The braces may be covered by suitable retaining plates (not illustrated herein). For a one-million bushel facility, having a five-foot retaining wall and built for grain having a rounded summit and a resting angle of 20 degrees, there may be eight octagonally positioned wall sections, each 109.7 ft. long. Such an installation may store a pile of corn, for instance, about 51 ft. high. Screw conveyor 10 passes through one of the sections of retaining wall 24.

Figure 3:
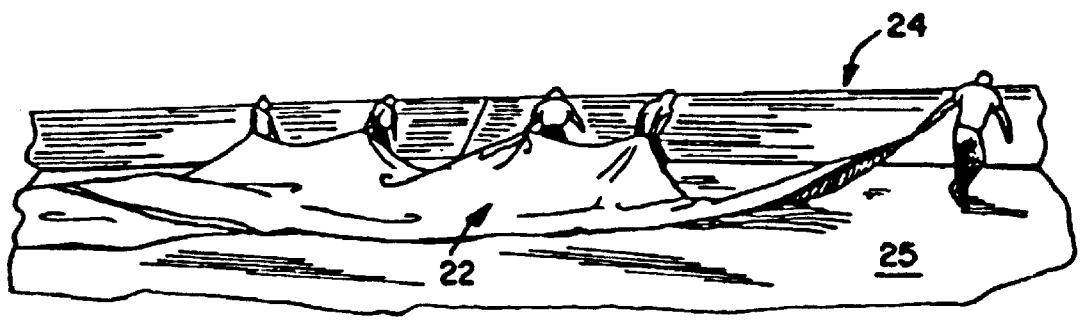
FIG. 3 is a pictorial illustration of the placement of a cover section.

Cover sections 22 are manually positioned inside retaining wall 24, as illustrated in FIG. 3. Cover sections 22 must be shaped in such a fashion as to permit sideward joining along marginal edges 23 in a starting position, that is, flat on support surface 25. Cover sections 22 also must be capable of conforming to the surface of a fully formed pile. These geometrical criteria are somewhat conflicting, as may be understood with reference to FIG. 6.

Figure 6:
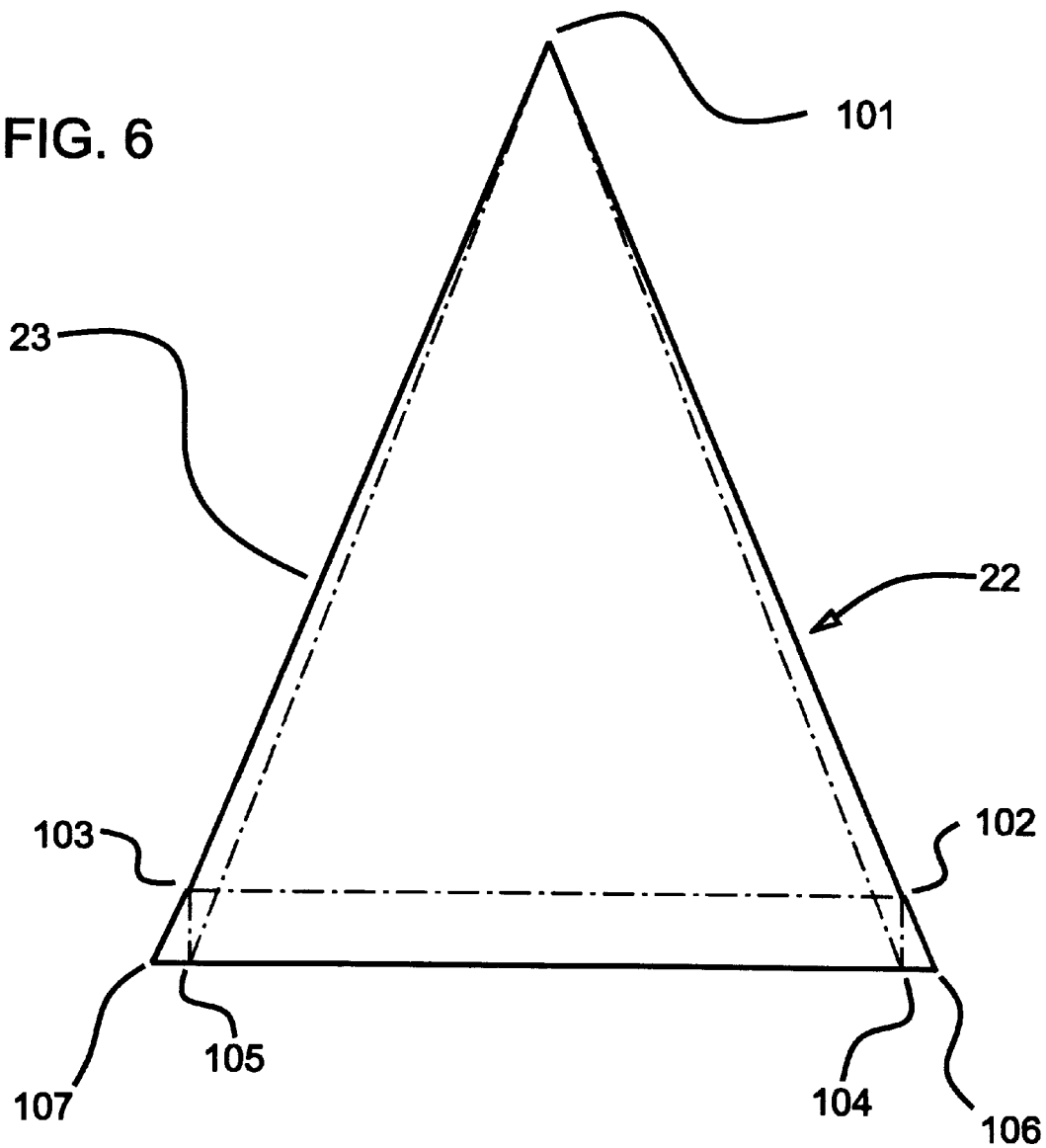
FIG. 6 is a schematic illustration of the geometry of a cover section.

Referring now to FIG. 6, a cover section 22 may have a triangular shape extending through points 101, 107, 106, 101. In order to meet the requirements of ground assembly, cover section 22 need only extend through points 101, 103, 102,101. This will permit sideward joining and will result in contact with retaining wall 24 along a line passing through points 103, 102. As the pile fills, cover section 22 pulls away from retaining wall 24 and therefore must lengthen. However, the required angle at the vertex decreases somewhat, so that the fully formed pile can be covered by cover sections 22 extending through points 101, 105, 104, 101. A cover section passing through points 101, 107, 106, 101 meets both criteria. It may be spread flat on the support surface 25 and welded against adjacent cover sections along lines passing through points 103, 101, 102. It may be backwardly folded or bunched away from retaining wall 24 along a line passing between points 103, 102. After the pile has been formed, cover section 22 may be welded to adjacent cover sections along lines passing between points 103, 107 and also between points 102, 106.

The pile is filled by insertion from below, as discussed previously. As the grain pile fills, small radially extending wrinkles develop concomitantly with movement of the cover section away from the retaining wall. Cover sections 22 may be joined to retaining wall 24 along the lines passing between points 107, 106. Such joinder may be accomplished either before or after filling. A marginal flap, not illustrated, may be attached to the outer edge of cover section 22 for passage over the top of retaining wall 24. Grommets, or similar devices, may be used for joining cover section 22 to retaining wall 24. For use in the above-described facility, the medial length (length of a perpendicular from point 101 to line 106–107 ) of a cover section 22 may be about 143.9 ft., and the width of the outer edge (line 106–107) may be about 119.2 ft.

Returning to FIG. 4, attention is directed to the grain flow path indicated by a series of broken lines 16. Preferably cover 21 rests initially upon screw conveyor 10 and upon base 25. Then as grain is discharged from screw conveyor 10, it buries insertion point 13 and begins lifting the cover. Meanwhile pile 30 grows into the illustrated configuration having a rounded summit 32 and sides which slope downwardly at a resting angle "A". Cover 21 is lifted to progressively higher positions, as indicated by phantom lines 21a, 21b.

Screw conveyor 10 is powered by a suitable electric motor 67, which supplies energy for moving the grain along the screw conveyor and for forming the pile. The pile consists of flowable granules which are stacked on top of one another, and which therefore have potential energy. This energy increases, as the pile grows. The screw conveyor must supply that energy . It also must also supply energy to overcome frictional drag forces which tend to resist granular movement within the pile. Finally the motor must supply power for pushing the grain through the screw conveyor itself. The following analysis addresses general system design parameters, including a procedure for estimating each of these three energy requirements.

This analysis is based upon observations of an operating scale model and upon a mathematical model constructed around those observations. The mathematical model has been programmed on a digital computer, and a series of resulting calculations are set forth in Table I. Results are tabulated for a series of pile sizes ranging from 100,000 to 2,000,000 bushels. All calculations are based upon a pile slope of 20 degrees, a grain feed rate of 5,000 bushels per hour and eight octagonally-arranged retaining walls, all 5 ft. high.

Figure 7:
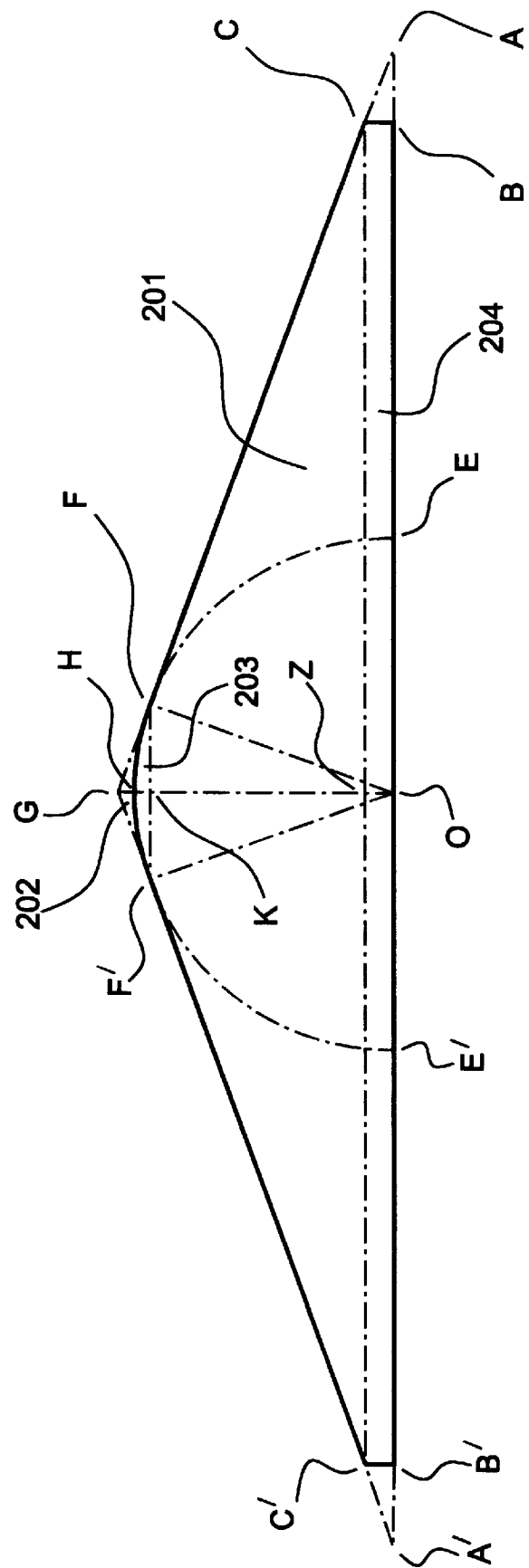
FIG. 7 is a geometrical sketch for explaining a mathematical model of pile formation in accordance with the invention.

Experiments with the scale model suggest that newly inserted grain granules blend into the pile by working their way randomly between previously inserted granules. This causes the pile to grow hemispherically upward and outward until it loses support and fractures conically downward. This general geometry is illustrated in the drawing at FIG. 7. The various features of the drawing are constructed with reference to a hemisphere centered at point "O" within a baseline A'–A and passing circularly through points E, H, E'. This hemisphere is tangent to a large cone 201 along at horizontal circle of tangency which projects as a phantom line passing through points F, F'. Large cone 201 has an apex at point G and a circular base projecting as a phantom passing through points C, C'.

A small cone 202 has an apex at point G and circular base defined by the above mentioned circle of tangency. Other features of interest are a cylinder 204 and a spherical segment 203. Cylinder 204 is that part of a grain pile which is retained by a circular support wall corresponding to eight wall sections 24. It is bounded above by the base of large cone 201 and below by a circular disk passing through points B, B'. Spherical segment 203 is a small chunk sliced off the construction hemisphere by a horizontal plane passing through the F, F' circle of tangency. It is that part of an hemispherical pile having an angle of repose sufficiently level to avoid collapse.

The mathematical representation of the grain pile comprises three components: the cylinder 204, the spherical segment 202 and a frustum formed by subtracting small cone 202 from large cone 201. The computer program calculated these volumes as a function of the hemispherical radius O-E and summed them to obtain the total pile volume. The hemispherical radius was incremented by small steps until the calculated volume converged on a bushel-amount tabulated in column 1 of Table I. The process was repeated for each listed pile size. Corresponding wall radii O-B and pile heights O-H are tabulated in Columns 2 and 3, respectively, of Table I.

Column 4 of Table I lists the widths of 5 ft. wall sections 24. These are the widths, which for an octagonal arrangement, would encompass the same areas as circles of corresponding wall radii taken from Column 2 of Table I. Column 5 of the table lists distances for paths extending angularly along line C-F and thence circularly along the arc F-H. This is the required medial length for a cover section 22. Requirements for motor 67 are calculated, as described below and are tabulated in Column 6 of Table I While the total energy expenditure is a matter of some importance, it is the rate of energy expense, or power which is of chief concern. It is easy to see that the maximum power requirement occurs when the pile reaches its maximum height. Although frictional losses in the conveyor remain fairly constant, the weight of grain being lifted and the friction within the pile both increase with increasing pile size. Therefore the power requirement calculation needs to be concerned only with the state of the pile at the moment immediately prior to completion of the fill.

The lifting power requirement, $Q_g$, is a function of the pressure at the insertion point and the rate at which new grain is being inserted. The exact pressure at the insertion point is unknown, but it is likely to be less than the overall average base pressure and certainly not more than the peak pressure. For a conservative estimate, the latter figure is used. That pressure is simply the product of the maximum height, H, and the grain density, $\rho$. The required lifting power is the product of the pressure and the grain feed rate, F, so we find:

$$Q_g = H\rho F$$

The mathematical model assumes that F is 103.7 ft$^3$ per min (5,000 bu per hr) and that $\rho$ is 50 lb per ft$^3$. H is the number of feet tabulated in column 3 of Table I.

The calculation of pile friction is somewhat more difficult and is performed with the aid of certain simplifying, but conservative, assumptions. In particular it is assumed that the pile has the shape of the large cone 201 and that all frictional losses result from sliding at the base. It is further assumed that the coefficient of sliding friction, $\mu$, is 0.3, and that R, the outermost radius of the growing pile, moves outwardly at a speed, Rdot, dictated by the feed rate. Additionally, it is assumed and that an interior point at a distance, r, from the center of the base moves outwardly at a speed, rdot, equal to R•Rdot/r.

A localized pressure is calculated by multiplying the local height by the grain density. The localized pressure then is multiplied by the elemental area and the coefficient of friction to obtain an elemental friction. An elemental power loss is calculated for each point of the base by multiplying the elemental friction by rdot. The product is integrated over the base to obtain the frictional power loss, $Q_f$. The final, integrated, result is expressed by the simple formula:

$$Q_f = \rho\mu FR$$

The power, $Q_p$, consumed in transporting the grain along a pipe of length, L, is easily shown to be given by the equation:

$$Q_p = L\rho\lambda F$$

where $\lambda$ is the coefficient of friction between the grain and the pipe (assumed to be 0.3). L is assumed to be equal to the pile radius.

The total power requirement, expressed in horsepower, then is given by:

$$Q = \frac{Q_g + Q_f + Q_p}{33,000}$$

A preferred screw conveyor for forming a one-million bushel pile at a 5,000 bu. per hr. rate has a diameter of 24 inches and runs with the trough 45% full at a speed of about 37 RPM. According to Table I, a drive motor of 20.9 HP is required, but a 50 HP motor is desired in order to provide a margin of safety. The preferred motor is an AC induction motor which operates at a speed of 1750 RPM from a 60 cycle, 440 volt power supply. Suitable gears are supplied for providing a screw drive at the desired rotation rate. The motor will pull the current required to develop the torque necessary to maintain the desired rotation rate, as the resistance of the grain pile increases. In order to provide 20.9 HP at 37 RPM, the motor should develop a torque of about 2968 lb.-ft. Alternatively, motor 67 could be a 50 HP DC motor having a rechargeable power supply, a shaft encoder and a microprocessor-based speed controller for producing a pulse-width-modulated driving current. No gear box would be required for such a DC motor.

TABLE I

Pile Fill Calculations
Pile Slope = 20 Deg
Fill Rate = 5,000 Bu./Hr
8-Sided Structure
5 Ft. Retaining Wall

| Pile Size (Bu.) | Pile Rad. (Ft.) | Pile Ht. (Ft.) | Wall Sec. Wid. (Ft.) | Cov. Sec. Med. Length (Ft.) | Rqd. Pwr. (HP) |
| --- | --- | --- | --- | --- | --- |
| 100,000 | 59.35777 | 25.1 | 47.87947 | 62.7946 | 9.539561 |
| 200,000 | 75.14639 | 30.50002 | 60.61496 | 79.51601 | 11.87646 |
| 300,000 | 87.42628 | 34.69999 | 70.52023 | 92.5214 | 13.69402 |
| 400,000 | 97.36707 | 38.09993 | 78.53872 | 103.0495 | 15.16537 |
| 500,000 | 105.5536 | 40.89989 | 85.14218 | 111.7197 | 16.37707 |
| 600,000 | 112.863 | 43.39985 | 91.03813 | 119.4609 | 17.45894 |
| 700,000 | 119.5877 | 45.69982 | 96.46241 | 126.5829 | 18.45427 |
| 800,000 | 125.4352 | 47.69979 | 101.1792 | 132.7759 | 19.31977 |
| 900,000 | 130.9903 | 49.59976 | 105.6601 | 138.6592 | 20.14199 |
| 1,000,000 | 135.9607 | 51.29973 | 109.6693 | 143.9233 | 20.87766 |
| 1,100,000 | 140.6387 | 52.89971 | 113.4427 | 148.8777 | 21.57006 |
| 1,200,000 | 145.0244 | 54.39968 | 116.9803 | 153.5224 | 22.21919 |
| 1,300,000 | 149.41 | 55.89966 | 120.5179 | 158.1671 | 22.86831 |
| 1,400,000 | 153.5033 | 57.29964 | 123.8196 | 162.5023 | 23.47416 |
| 1,500,000 | 157.3042 | 58.59962 | 126.8855 | 166.5277 | 24.03674 |
| 1,600,000 | 160.8127 | 59.7996 | 129.7156 | 170.2435 | 24.55604 |
| 1,700,000 | 164.3212 | 60.99958 | 132.5456 | 173.9593 | 25.07534 |
| 1,800,000 | 167.8297 | 62.19957 | 135.3757 | 177.6751 | 25.59464 |
| 1,900,000 | 171.0459 | 63.29955 | 137.9699 | 181.0813 | 26.07066 |
| 2,000,000 | 174.262 | 64.39954 | 140.5641 | 184.4874 | 26.54669 |

Returning to FIG. 1, grain pile 21 is covered by a series of triangular sections of flexible canvas material 22. Cover sections 22 are provided with aeration vents 62 and are sidewardly joined by welding along mating edges 23. A series of fans 60 are mounted on retaining wall 24 for forcing a flow of air into the grain pile. Air pressure within the pile of grain is relieved by outward flow through vents 62. This cools the grain for prevention of spoilage. It may be stated very generally that fans 60 and vents 62 should provide airflow at the rate of about 0.1 to 0.25 cu. ft. per min. per bu. Fans 60 may be connected to perforated ventilation tubes (not illustrated) extending along base 25.

Figure 2:
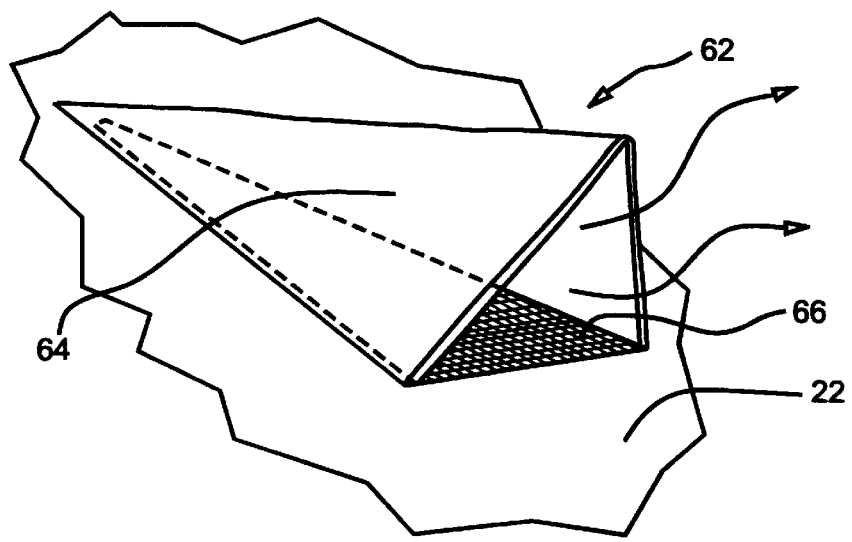
FIG. 2 is a perspective view of an aeration vent.

Details of a typical vent 62 are shown in FIG. 2. Thus a vent 62 may comprise a section of screening 66 fitted into an opening in cover section 22. Screening 66 has a mesh which is fine enough to confine the grain kernels inside the cover. Screening 66 is covered by a hood 64, which may be constructed of either flexible material or stiff material. If the construction material for hood 64 is sufficiently rigid to be self-supporting, then fans 60 may be reversed to suck air inwardly through vents 62. This has the advantage of minimizing wind damage by causing cover sections 22 to conform tightly to the surface of the underlying grain.

Figure 5:
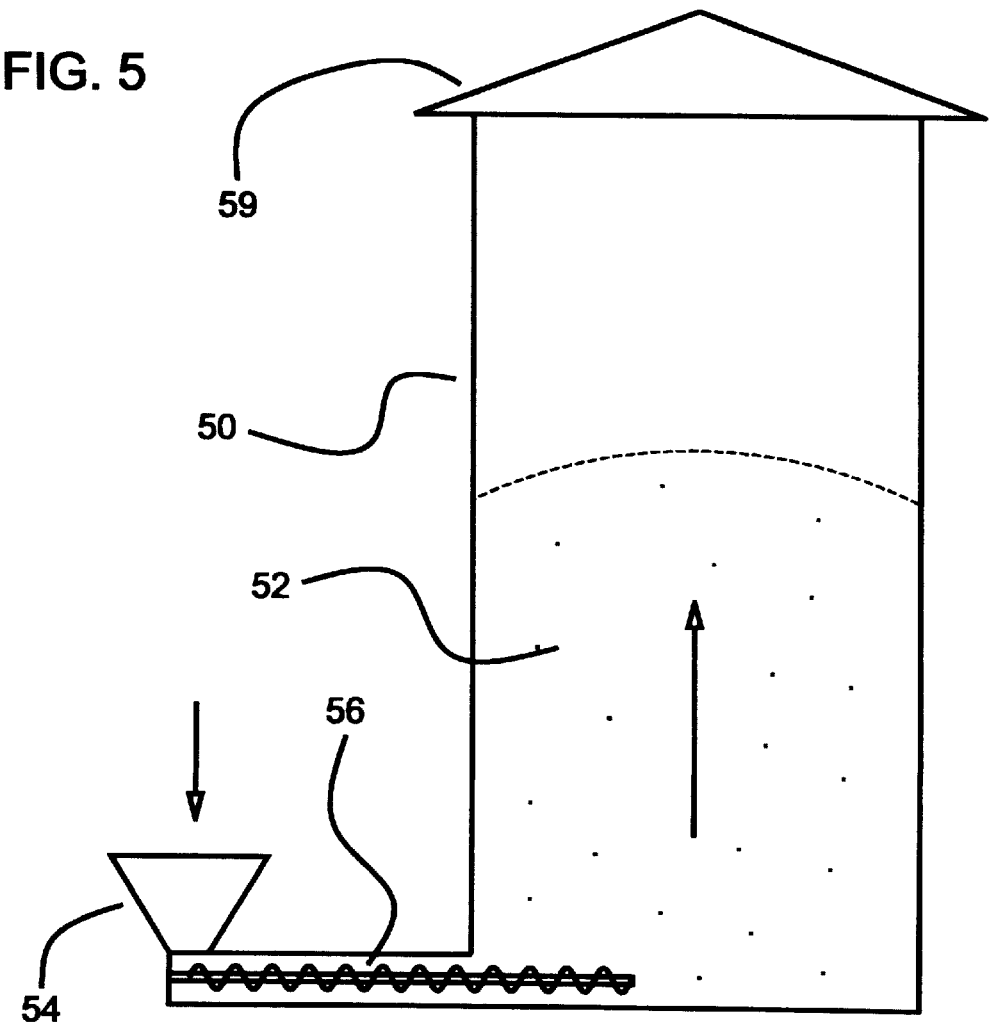
FIG. 5 is a side elevation view of a pile being formed inside a traditional storage facility in accordance with the method of this invention.

FIG. 5 illustrates the use of the pile formation method to erect a grain pile 52 inside a silo 50 having a cover 59. Grain which is to be stored in silo 50 is poured into a hopper 54, positioned for supplying grain to a horizontally extending screw conveyor 56. Screw conveyor 56 extends inwardly to the center of silo 50, so that grain pile formation may proceed in a manner analogous to the process illustrated in FIG. 4. Conventional aeration equipment, not illustrated, may be used to retard spoilage of the grain during storage in silo 50.

It will be understood that the above-described screw conveyor is merely exemplary. Another positive displacement grain feeder, such as a reciprocating piston could be used in place of a screw conveyor. All that is necessary is that the grain feeder be able to push grain into the insertion point with sufficient force to enlarge the pile at the desired rate.

It will be further understood that the method of this invention may be practiced where the end object of piling is the blending of grains of different properties. In such an event grains of different properties are inserted into a pile at different points in space or time. Thus two or more simultaneously operating screw conveyors could insert grain of different properties into different insertion points within the same pile core, or grain of different properties could be fed to the same screw conveyor on a time-shared basis. An example of the former type of system is illustrated in FIG. 8.

Figure 8:
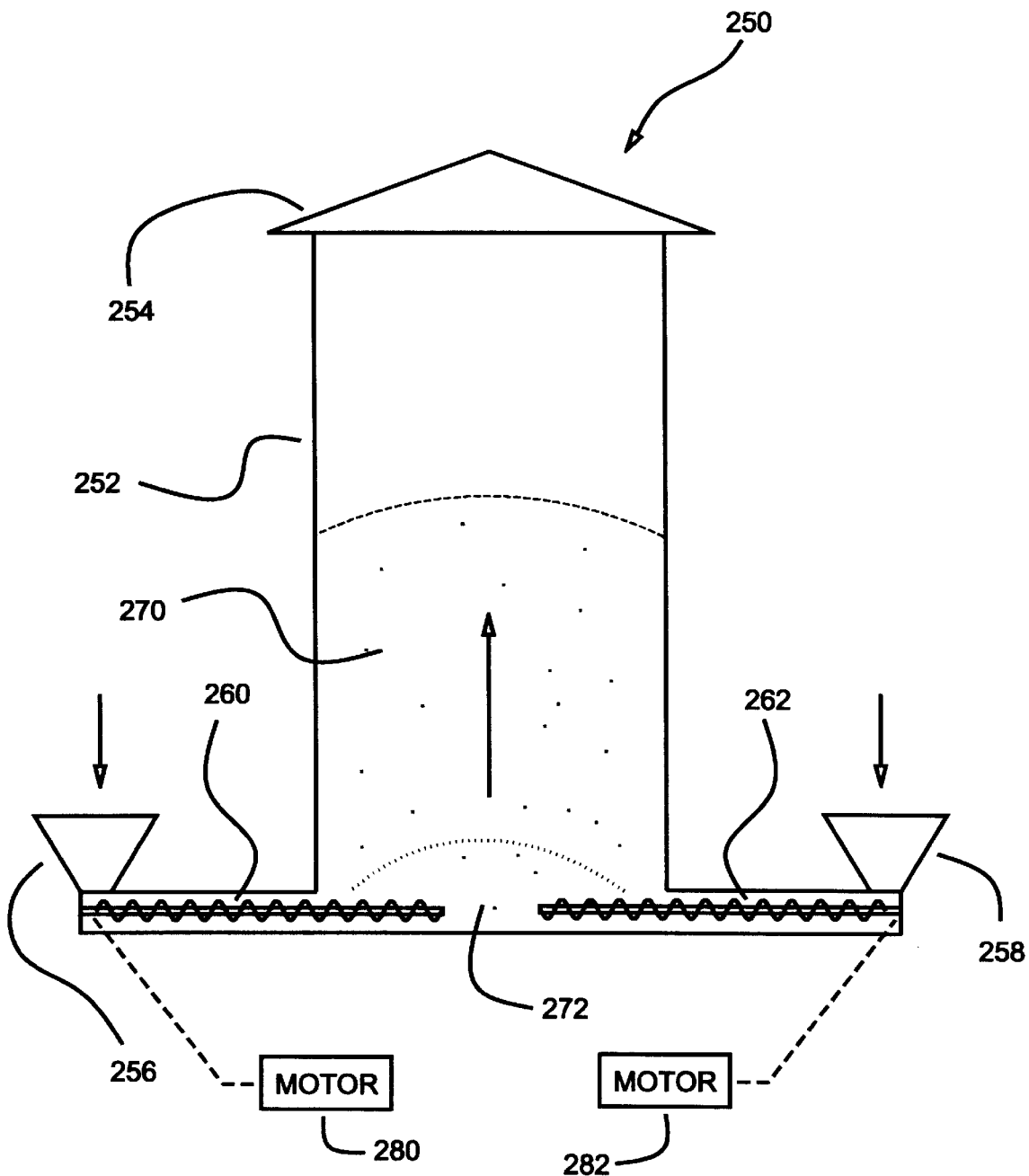
FIG. 8 is a sketch of a grain blending system according to the invention.

As shown in FIG. 8, a grain blending system 250 may comprise a silo 252 having a roof 254 and a pair of hoppers 256, 258. Hopper 256 is served by a screw conveyor 260 having a drive motor 280, while hopper 258 is served by a second screw conveyor 262 and another drive motor 282. A first grain of desired properties is fed into hopper 256, and a second grain of different desired properties is fed into hopper 256. The two grains are inserted into a common pile core 272 by screw conveyors 260, 262, whereupon a blending takes place, and a pile 270 is formed. Pile core 272 may be created by either of screw conveyors 260, 262 or jointly by both conveyors. Feeding of the two grains may proceed either alternately or simultaneously. It is believed, however, that simultaneous feeding will produce more uniform blending. Both screw conveyors may be constructed as generally illustrated in FIG. 4, and will have drive motors appropriate for the size of the blended pile.

It will be understood that the pile formation method of this invention could be performed in facilities other than those described herein. For example, the invention could be practiced in farmer-owned facilities of relatively small size and under flexible covers having sewn-in floors. Thus, while the method herein described constitutes a preferred embodiment of this invention, it is to be understood that this invention is not limited to this precise method, and that changes may be made therein without departing from the scope of the invention, which is defined in the appended claims.

What is claimed is:

1. A method of piling grain into a pile of suitable size for storage thereof, said method comprising the steps of:
   (1) receiving a supply of grain to be formed into said pile;
   (2) forming a relatively small pile core; and
   (3) forcibly enlarging said pile core into a relatively much larger pile of said size by pushing said supply of grain into said pile core against gradually increasing natural resistance thereto.

2. A method according to claim 1, said pile core being formed under a self-supporting roof.

3. A method according to claim 2, said pile core being formed inside an enclosed retaining wall, sized and positioned for giving lateral support to said pile.

4. A method according to claim 1, said pile core being formed under a flexible cover, sized for protecting said pile, said flexible cover initially being collapsed and thereafter being lifted and supported by said grain as said pile core is enlarged into said pile.

5. A method according to claim 4, said pile core being formed inside an enclosed retaining wall, sized and positioned for giving lateral support to said pile.

6. A method according to claim 1, said grain being received at a receiving point and being pushed into said pile core at an insertion point, said method further comprising the steps of extending a trough between said receiving point and said insertion point, placing a screw into said trough, connecting a motor for rotating said screw, placing said supply of grain into said trough, and applying power to said motor for causing said screw to perform said enlarging.

7. A method according to claim 6, further comprising the steps of covering said trough, closing said trough against forces of said natural resistance by placing a stuffing box thereagainst, and positioning said screw to extend through and beyond said trough and said stuffing box.

8. A method according to claim 1 further comprising the steps of extending a screw conveyor into a formation region for said pile core, feeding grain of different properties into said screw conveyor at alternate times, and operating said screw conveyor to push said grain of different properties blendingly into said pile core.

9. A method according to claim 1 further comprising the steps of extending a plurality of screw conveyors into a formation region for said pile core, feeding grain of different properties to different ones of said screw conveyors, and operating said screw conveyors to push said grain of different properties blendingly into said pile core.

10. A method of storing grain, said method comprising the steps of:

(1) receiving a supply of grain at a receiving point;

(2) transporting a portion of said supply of grain along a generally horizontal path from said receiving point to an insertion point, spaced apart from said receiving point, surrounded by a retaining wall, and situated beneath a cover;

(3) causing said portion of said supply of grain to become incorporated into a pile core extending above and about said insertion point;

(4) repeating said transporting step, so that an additional portion of grain from said supply arrives at said insertion point;

(5) forcibly enlarging significantly said pile core with said additional portion of grain by pushing said additional portion of grain into said insertion point against natural resistance from previously inserted grain;

(6) repeating aforesaid steps until said supply of grain has been incorporated into a pile extending outwardly against said wall; and (7) aerating said pile.

11. A method according to claim 10, further comprising the steps of: extending a trough between said receiving point and said insertion point, placing a screw into said trough, and connecting a motor for rotating said screw, said transporting step comprising the sub-steps of placing said portion of said supply of grain into said trough, and applying power to said motor in sufficient amount for generating a torque which rotates said screw at a predetermined rate.

12. A method according to claim 11, said enlarging step comprising the sub-steps of placing said additional portion of grain into said trough and applying increased power to said motor for maintaining rotation of said screw at said predetermined rate.

13. A method according to claim 12, further comprising the steps of covering said trough, closing said trough against forces of said natural resistance by placing a stuffing box thereagainst, and positioning said screw to extend through and beyond said trough and said stuffing box.

14. A method according to claim 13 wherein said aerating step comprises the sub-step of circulating outside air between said retaining wall and said cover.

15. A method according to claim 14, further comprising the step of assembling said cover by the sub-steps of: preparing a plurality of flexible cover sections which when joined will form a grain cover able to lay flat on a horizontal support surface and also able to conform to said pile upon formation thereof, resting said cover sections vertically adjacent said insertion point and prior to performance of said transporting step, and joining said cover sections.

16. A method according to claim 15 further comprising the step of securing said grain cover against said retaining wall.

17. A method of storing grain comprising the steps of:

(1) erecting a retaining wall surrounding a support surface;

(2) positioning a screw conveyor to extend from a receiving point outside said retaining wall to an insertion point inside said retaining wall;

(3) positioning a flexible cover inside said retaining wall;

(4) delivering grain to said receiving point;

(5) operating said screw conveyor to carry said grain away from said receiving point and to forcibly discharge said grain at said insertion point, so that said grain disperses upwardly from said insertion point and forms into a pile which continuously supports and is continuously covered by, said cover, said pile having a rounded center portion positioned above said insertion point and a frusto-conical surface which extends downwardly from said center portion and outwardly to a resting position against said retaining wall; and (6) aerating said pile.

18. A method according to claim 17 further comprising the step of assembling said cover in place by joining a plurality of generally triangular cover sections.

19. A method according to claim 18, further comprising the step of securing said cover against said retaining wall.

* * * * *